Jan. 25, 1966    M. A. BUFFINGTON    3,230,950
APPARATUS AND METHOD FOR INDIRECT BLOOD
PRESSURE DETERMINATIONS
Filed Oct. 17, 1961    2 Sheets-Sheet 1
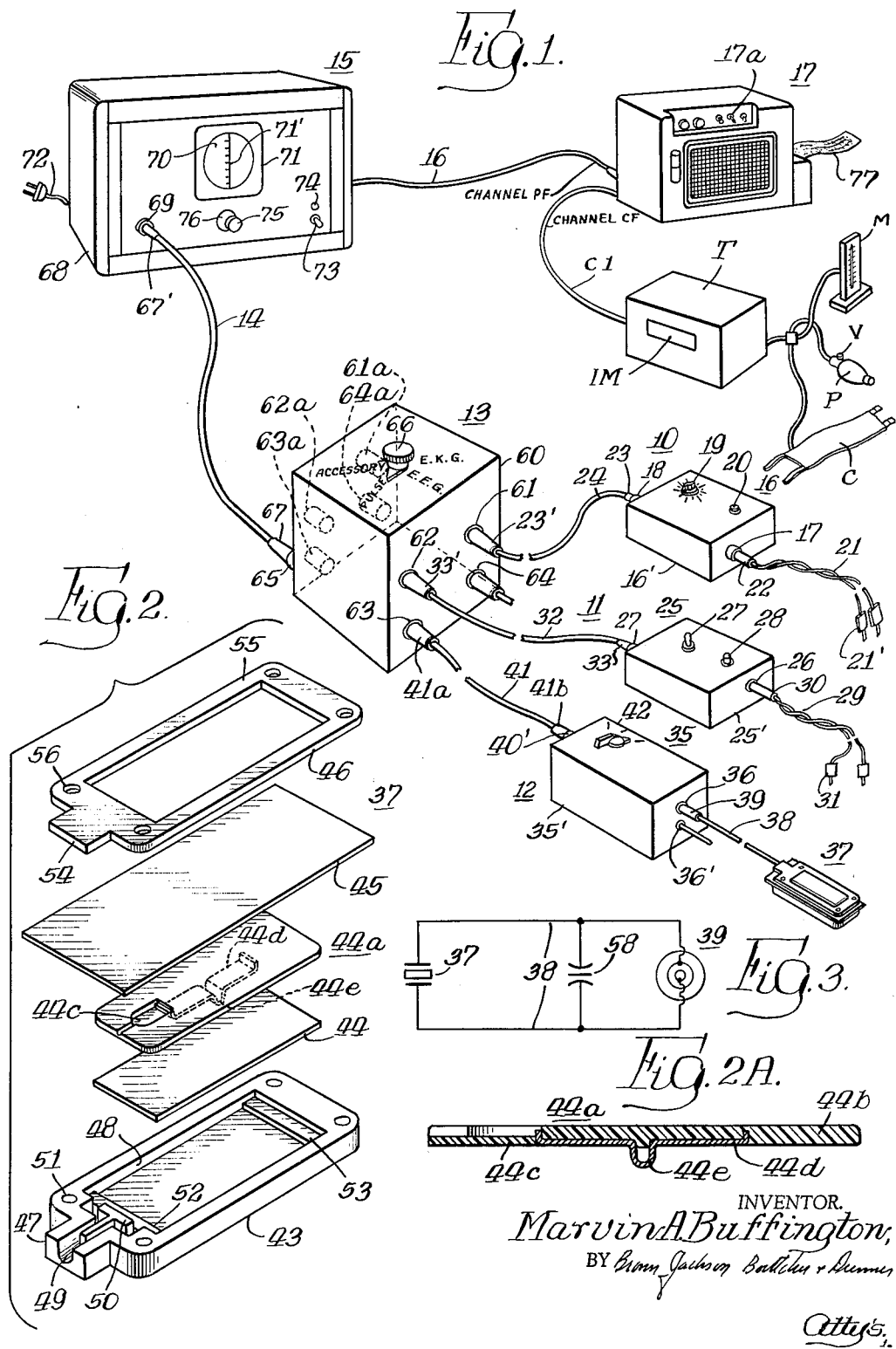
INVENTOR.
Marvin A. Buffington,
BY *Brown Jackson Boettcher + Dienner*
Att*ys*.

INVENTOR.
Marvin A Buffington

United States Patent Office 3,230,950
Patented Jan. 25, 1966

3,230,950
APPARATUS AND METHOD FOR INDIRECT
BLOOD PRESSURE DETERMINATIONS
Marvin A. Buffington, Cleveland, Ohio, assignor to The Bishop and Babcock Corporation, a corporation of Ohio
Filed Oct. 17, 1961, Ser. No. 145,698
15 Claims. (Cl. 128—2.05)

The present invention is directed to a new and novel apparatus and method for use in the clinical monitoring of physiological phenomena.

As a result of extensive research, study and experience in the field, it has become increasingly apparent that the monitoring of physiological phenomena of the patient in the operating room (and in many instances at bedside in the recovery room) is a technique which must be considered as basic to the accomplishment of an intelligent evaluation of the patient's condition by the attending physician. The physiological phenomena which are preferably monitored in effecting such evaluation will, of course, vary with the nature of the patient's condition. However, the more commonly monitored phenomena in the so-called dynamic group include cardiac potentials (electrocardiograms—EKG), arterial blood pressure and pulse, cortical depression (electroencephalograms—EEG), respiration and the like. The more commonly monitored phenomena in the so-called static group include temperature, pressure, oxygen levels, and the like.

Experience has indicated that an immediate and more serious need presently exists in clinical areas for equipment which reliably monitors the phenomena of the dynamic group. It has been particularly observed that there is a need for equipment which provides a display of information pertaining to such phenomena in a manner which permits ready viewing of the information without requiring studied examination and time-consuming interpretation by the physician or his assistants. Stated in another manner, the ability to present monitored information of the dynamic phenomena to the working staff for immediate use is considered paramount to the provision of a monitoring device satisfactory for clinical usage. It is a primary object of the present invention, therefore, to provide a new and novel monitoring apparatus which is operative to provide a display of dynamic phenomena in a simplified presentation, and particularly in a display which permits immediate understanding and use of the information by the viewer and which is consistent with presently accepted clinical procedures.

According to established clinical procedure (see for example Glasser—Medical Physics, volume 3, Year Book Publishers, Inc.) a minimal surgical monitoring system would include a monitor set including a display device, such as a cathode ray tube for providing a visual display of the information to the user, pickup means for use in electrocardiography and electroencephalography and/or in detecting pulse information, control means including preamplification means for coupling the detected information to the display device, and support means which permits disposition of the monitor set at a safe location. In many installations, it is also necessary to provide explosion-proof power line connections for use in the connection of the components of the monitoring system to a power source.

In monitoring units provided heretofore for such use, it has been conventional to provide a pickup means which is adapted to be coupled to appropriate areas of the patient, and conductor means for extending the signals detected to the amplifier means (in the monitor display device) for amplification prior to coupling to the cathode ray tube of the monitor. It has been found that such systems include many inherent disadvantages. That is, the patient's signal detected by the pickup means attached to the patient is, at best, of a relatively small value, and the transmission of the small amplitude signal over the interconnecting cables to the amplifier devices in the monitor unit results in further signal loss. Additionally, the numerous high voltage devices utilized in hospitals frequently create serious electrical interference problems which tend to interfere with the signal transmission, and in many installations the pickup signal coupled to the monitor devices is too badly mutilated to permit the display of an intelligent information set. As a result, the removal of the amplifiers from the monitor unit, and the relocation thereof adjacent the patient appeared to be an advisable step in the elimination of such problem. Such relocation was particularly desirable in ward use which required cables of much longer length, and therefore were more subject to interference pickup.

Unfortunately, in many installations the presence of volatile gases in the area of surgery is not uncommon, and as a result, such modification would require the use of additional explosion-proof power cable which extends from a power source to a gas-tube amplifier in the clinical or surgical area. Such modification would further require an amplifier housing which is also of an explosion-proof construction. Since the gas tube amplifier units conventionally used to operate cathode ray tube devices are somewhat bulky, and since mounting space in most surgical areas is at a minimum, the further addition of the bulky explosion-proof cables and housing merely tends to amplify an existing problem. In providing a solution to such problem, it is a further object of the present invention to provide a monitoring system in which the instrumentation including the pickup means for electrocardiography, electroencephalography and/or pulse detection is coupled to a small compact box which may be readily located in the area of the patient, which box includes a novel transistorized preamplifier operated by low voltage batteries housed within the box, whereby the problems inherent in the use of conventional monitor units are eliminated, while yet providing a system in which the detected signals are amplified prior to their transmission over the interconnecting cables to the monitor device. As a result of signal amplification at the approximate source of detection, the interference problem is substantially eliminated and reliable signal display is consistently obtained.

As noted above, the novel monitoring system is particularly well-adapted to provide information pertaining to the more dynamic physiological phenomena, such as the blood pressure of a patient. The need and attempt to provide more simplified, reliable and constant monitoring of blood pressure for surgery recovery rooms and critical wards has been well stated and outlined by Sadove and Cross in "The Recovery Room," Saunders ('57); Glasser—Medical Physics, vol. 3, pp. 391–396, Year Book Publishers, 1960 and Dornette and Brechner, "Instrumentation in Anesthesiology," Lea and Febiger ('59); and others.

In the long search for a satisfactory system for use in monitoring blood pressure in clinical areas, it was early apparent that an acceptable system must have a display arrangement which is consistent in its use with existing blood pressure determining techniques, whereby the need for extensive study of new techniques by the physician and his staff is eliminated or substantially minimized.

Similarly, it was important that the observational media provided in the new system correspond, or bear a close relation, to the information provided by known, currently practiced techniques. That is, in most monitoring techniques, the analysis of the phenomena provided by the system is left to the judgment of the physician on the basis of accepted empirical forms of presentation, and failing a basic similarity between the new and the old, both as to technique and the information provided, the transition from the old to the new introduces the possibility of human error during the transitional period.

It is yet another object of the present invention therefore to provide a new and novel monitoring system for providing simplified and reliable monitoring of patient blood pressure in clinical areas in a manner consistent with known techniques, and additionally to provide information in a manner which is consistent with the information provided by the accepted techniques now used and known in the field.

Briefly, the novel monitor apparatus which is operative to provide the display of patient blood pressure in a manner which is related to the manner in which such information is now obtained, basically comprises a standard patient cuff, automatic or manual means for inflating and determining the extent and rate of cuff inflation, a novel pulse transducer adapted to be attached to a surface artery of the patient as a pulse pickup device, and amplifier means for amplifying the pulses generated by the pickup means prior to the coupling of the same over a conductor set to associated display equipment, such as a cathode ray tube, for display purposes.

As will be shown hereinafter, the resultant display provided on the cathode ray tube is closely related to the audio information which the physician now obtains by the use of a stethoscope, and is even more closely related to the palpatory method of feeling the pulse while taking the blood pressure, whereby a transition from the known practices to the new techniques may be safely effected. Additionally, the new apparatus is more sensitive, more reliable, less time consuming and more adaptable to multiple patient usage. An added advantage inherent in the use of a visual display device lies in the ability of all members of the working staff to view the information simultaneously and continuously, whereby an obvious added safety factor is automatically introduced.

In a further novel embodiment of the invention an automatic recorder device is used with the visual display unit, and the signal output of the pulse transducer is recorded on one channel of the recorder device. Simultaneously a signal continually indicative of cuff pressure is transmitted to a second channel of the recorder device by an "air pressure to electrical current transducer" which is coupled between the patient cuff and the recorder, the transducer providing signals to the recorder device which result in a calibrated pressure curve on the recorder chart which corresponds to the pressure in the patient cuff expressed in millimeters of mercury. The recorder device in its multiple channel recording provides a permanent record of the pulse-pressure information in a superimposed display, which information may be readily correlated at any time to provide patient blood pressure according to well established empirical standards and techniques. Since a record is being continuously provided, no time is wasted in searching for a pulse or in studying pressure level during the practice of the technique.

It is a further object of the present invention to provide a novel method of providing indications of the patient pressure without requiring a serious departure from known techniques. One method comprises attaching the pulse transducer of the novel monitor system to the patient artery desired to palpate, pressurizing the patient cuff, venting the cuff in accordance with established systolic blood pressure determining techniques, and observing the reading in mm. of mercury at the point of pulse cutoff by the cuff pressure, and at the point of pulse return due to declining cuff pressure, the respective point being ascertained by viewing of the continuous pulse indications provided on the display device, or by viewing of the information provided by the adjacent curves on the recording device.

It is a further object of the invention to provide a novel method of determining patient blood pressure which comprises the steps of placing a cuff envelope on an artery of the patient, inserting the pulse transducer within the cuff envelope with the sensitive side against the bladder of the the cuff, pressurizing the cuff, and observing the point of maximum pulse to determine the *mean* blood pressure.

In various attempts to provide a satisfactory blood pressure monitor system heretofore, particular difficulty has been experienced in obtaining a pulse signal from the patient which is of sufficient amplitude and distinctness to be reproduced on the display device in a clearly discernible manner. That is, in most previously known arrangements, the pulse transducer was made extremely sensitive to a broad range of frequencies (or additional amplification was introduced) for the purpose of obtaining a signal of sufficient amplitude to permit the reproduction of the signal on the display device. In providing such sensitivity, however, the device was also made susceptible to other noises in the area and even the slightest movement of the patient body would generate signals which were displaced on the display device with the pulse information. In most instances the interference was of an order which prevented the reliable use of the equipment. Alternatively when the sensitivity of the pickup devices (or the amplification) was reduced, the pulse signal was so small as to preclude the detection thereof on the display device.

It is a further object of the present invention therefore to provide a novel transducer or signal generating device which is operative to provide signals representative of a patient's pulse of a sufficient amplitude to be readily reproduced and observed on the display device while yet eliminating or substantially minimizing the interference normally experienced in such type displays. It is yet another object of the invention to provide a signal generating device having these improved operating characteristics which is of a materially reduced size, and of a shape to permit the use of the device on most areas of the patient's body. As a result of such configuration and size, the novel device may also be used in the detection of other physiological surface pressures and movements, such as respiration and the like, with equal ease and reliability.

It is still another object of the invention to provide a monitoring device which is readily adaptable for use in a central monitoring system which utilizes the novel monitor apparatus and techniques set forth above to selectively scan and record the dynamic phenomena of each of a plurality of patients located at a plurality of different monitor positions remote from a control or supervisory position, whereby a single attendant may rapidly monitor the condition of a number of patients in a more expeditious and reliable manner.

The foregoing objects and features of the invention and others which are believed to be new and novel in the art are set forth in the following specifications, claims and drawings in which:

FIGURE 1 is an illustration of the basic components of a novel monitoring system for obtaining and displaying electrocardiogram, electroencephalogram, cuff pressure and pulse information according to the invention;

FIGURE 2 is an exploded perspective view of the component parts of a novel pulse transducer used in the of FIGURE 1;

FIGURE 2A is a sectional view of a part in the transducer of FIGURE 2;

FIGURE 3 is a diagram of the electrical circuit of the novel pulse transducer of FIGURE 2;

Specific description

Figure 4:
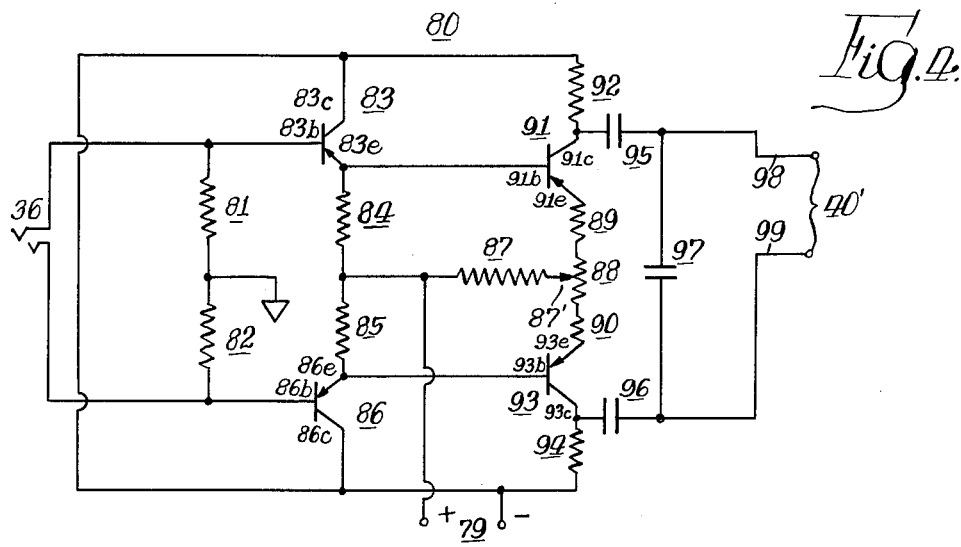
FIGURE 4 is a circuit diagram of a transistorized amplifier for use with one of the signal detection sets including the novel pulse transducer in the monitor system.

With reference to FIGURE 1, the novel monitoring system may basically include one or more signal detection sets including an electrocardiogram preamplifier and signal detection set (EKG) 10, an electroencephalogram preamplifier and signal detection set (EEG) 11, a pulse preamplifier and detection set 12, and a selector box 13 which is operable to selectively connect the signal output of any one of the preamplifiers and signal detection sets 10, 11, 12 over cable means 14 to a display device 15 for visual observation by the user. The signal set coupled to the display device 15 may also be coupled over cable 16 to a channel PF on recorder 17, or if preferred may be directly coupled to channels on the recorder 17 by means of the separate cables 24, 32 and 41. The latter method of connection is not shown in the drawings.

Blood pressure determining apparatus adapted for use in the system includes a standard patent cuff C, pressure pump or bulb P having a vent V coupled by hose or other suitable means to a standard cuff C to control the inflation and deflation thereof. A manometer M connected to the system provides a continual indication of the system and a transducer T connected to the system provides electrical signals representative of the value of the pressure in the system over conductor C1 to a channel CF on recorder 17. A meter 1M permits visual determination or readout of the pressure representative signals provided by transducer T.

(a) *EKG and EEG signal detection sets.*—The electrocardiogram signal detection set 10 basically comprises an amplifier unit 16 including a compact rectangular box or housing 16' which in one embodiment had dimensions of approximately 6½" x 4½" x 3½" containing a transistor amplifier circuit (similar to amplifier circuit 80, FIGURE 4, described in more detail hereinafter), a multiple-socket input jack 17 located on one side wall of housing 16' for connecting each of a plurality of detector leads 21 over separate paths to different selectable positions on a selector switch (not shown). A control knob 19 located on the top side of housing 16' is adjustable to different positions, and in such adjustment controls the selector switch (not shown) in the selection of correspondingly different ones of the pickup leads 21 for connection to the input circuit of the amplifier therein. A signal output jack 18 located on a second side wall of housing 16' is connected to the output circuit of the amplifier, and an output cable 24 having plugs 23 and 23' at the remote ends thereof connects to jack 18 to extend the signal output of amplifier to a cooperating jack 61 on the selector box 13. A calibration button 20 permits calibration of the amplifier unit according to well known calibration principles.

Pickup conductors 21 (only two of which are shown in FIGURE 1) are of the type conventionally used for the purpose of sensing signals on the patient's body for electrocardiogram purposes. (See, for example, Instrumentation and Anesthesiology, Dornette and Brechner, pages 61–66. Each pickup lead includes a sensing electrode 21' at one end thereof for attachment to a plate and strap on the patient body, and a plug 22 having multiple pins at the other end thereof for connecting each conductor to a different one of the multiple input sockets on the jack 17.

The amplifier 80 (described more fully hereinafter) located within the housing 16' for the purpose of amplifying the signal detected by the selected pair of the electrodes attached to the patient body, has a gain in the order of 10, a time constant of one second, frequency response which is flat to 30 cycles per second filtered, and a stability variaton of 5%. Although only two conductors 21 are shown, control knob 19 is adjustable to seven different positions to thereby permit the selective connection of the signals on seven different pairs of EKG conductors to the system. The circuits of the amplifier are completely transistorized and are powered by two six volt batteries located within housing 16' which have a life of one year in normal usage.

The novel structure of the amplifier unit 16 permits location of the unit adjacent the area of signal detection, and amplification may therefore be effected prior to transmission of the signals over the connecting cables to the display device. Such manner of amplification in turn minimizes the effects of interfering electrical signals, and results in a more sensitive system. Further, the inclusion of the amplifier power supply in the same housing adjacent the signal detection location eliminates the need for bulky cable connections from the conventional A.C. power supplies, and eliminates the need in many installations for bulky explosion-proof type connectors and housings. As shown in more detail hereinafter, the provision of amplification at such location makes possible the provision of a novel central monitoring system.

The electroencephalogram signal detector set 11 comprises an amplifier unit 25 including a rectangular housing or box 25' similar in size and shape to housing 16' for containing a transistor amplifier circuit, such as amplifier circuit 80 (FIGURE 4), an input jack 26 and an output jack 27 located on a first and second side wall of the housing 25'. A three position switch 27 is located on the upper surface of the housing 25'; the three positions including an "off" position, an "on" position, and a calibration position. Calibration push button 28 is also located on the upper surface of housing 25' for use with the switch in calibrating the amplifier unit. Pickup leads 29 are terminated at one end by conventional EEG needle electrodes 31 and at the other end by a plug 30 which mates with jack 26 on the housing. Jack 26 is in turn connected to the input circuit of the amplifier circuit within the housing. Output jack 27 is connected to the output side of the amplifier circuit, and output cable 32 having plug ends 33, 33' respectively, is connected to extend the output of the amplifier unit from jack 27 to jack 62 on the selector box 13. The amplifier circuit for the electroencephalogram signals is located within the housing 25' and is connected to amplify the signals detected by the electrodes 31 on the patient body and to extend the same over the output conductor 32 to the selector box 13, as shown in FIGURE 4 and described in more detail hereinafter.

In one commercial embodiment, the amplifier circuit had a gain in the order of 100, a time constant of ⅓ second, a stability variation of less than 5% and a frequency response which was flat to 30 cycles per second filtered, and flat to 200 cycles per second as unfiltered for other uses. The amplifier is powered by two six volt batteries located within the housing 25', the batteries having a life of one year in normal usage. As noted above, preamplification by the amplifier unit 25 adjacent the signal pickup location reduces cable and switching noises, and provides increased stability and interference-free displays.

(b) *Pulse detector set.*—The novel pulse detection set 12, as shown in FIGURE 1, includes an amplifier unit 35 including a box or housing 35' having palpation input jack 36, oscillation input jack 36', and output jack 40' located on the end walls of the housing 35'. A three position selection knob 42 accessible on the top wall of the housing 35' has an off position in which the amplifier is de-energized and an oscillation position and a palpation position for alternatively connecting the palpation and the oscillation jacks 36, 36' to the input side of the amplifier circuit.

A novel pulse transducer 37 is connected to the amplifier over a single conductor shielded microphone cable 38 having a plug 39 adapted to mate with input jacks 36 and 36'. Output jack 40' is connected to the output side of the amplifier in the housing 35' and output cable 41 having plugs 41a, 41b at the extreme ends thereof, connects to the output jack 40' for the purpose of conducting the amplified signal output of amplifier unit 35 to jack 63 on the selector box 13.

The novel pulse transducer 37 is shown in an exploded view in FIGURE 2, and as there shown, comprises a bottom plate 43, a piezo-electric crystal element 44, a contact plate 44a, a gum rubber cover 45, and a top plate 46. The bottom plate 43, which may be of a nylon material, is a rectangular shaped member having a recess 48 and a projecting lug 47 located at one end thereof which include a U-shaped cutaway section 49 to provide a passageway for the ends of the conductor and shielded cable 38 into recess 48. A T-shaped divider 50 is formed at the inner end of the U-shaped passageway 49, the base end of the T being located within the passageway and the top end being located within a cooperating or mating section of the recess so that the T member acts as a separator and strain relief for the ends of shielded cable 38 which are extended inwardly into recess 48.

Rivet holes 51 extend through the four corners of the bottom plate 43. Ledge or shelf members 52 and 53 are located at opposite ends of the recess 48 to provide a supporting ledge for the ends of piezo-electric crystal 44 as deposited within the recess 48.

The piezo-electric crystal element 44 may be of the type which is commercially available from the Clevite Electronics Company, and identified as a 60071–PB–P2T unit comprised of PZT material. In one commercial embodiment, the crystal element 44 was $1\frac{11}{16}$ inches in length and ⅝ inch in width, and was silver plated on each side to facilitate connection of an electrical conductor thereto.

Contact plate 44a (which is also shown in section in FIGURE 2A) comprises a rectangular shaped plastic member which is slightly smaller than the crystal element 44, and locates a cutout portion 44c at one end thereof to facilitate connection of one of the conductors of cable 38 to a pusher contact member 44d which is also supported thereby. In one embodiment, the pusher contact member 44d comprised a copper strip having end portions which are bent inwardly and reclined or embedded in the plastic member 44a and a central portion which is formed to provide a raised contact surface 44e. As mounted on the plastic member 44a, the outer surface of the member 44d and the lower surface of plastic member 44a are in a common plane, and the contact surface 44e extends outwardly from such plane for contact with the crystal element 44. In the assembled transducer, the contact surface 44c extends laterally across the crystal element 44 at the approximate midpoint thereof.

The gum rubber layer, which covers and secures the contact plate 44a against lateral movement, is made of conventional 30 gauge gum rubber, such as commercially used for dental dams, and in the assembly is laid in superposed relation with the upper surface of the contact plate 44a and also in overlying relation with the upper surface of bottom plate 43.

The top or upper plate 46 is used as a retainer for rubber 45, crystal 44, and contact plate element 44a, and as shown in FIGURE 2 comprises a rectangular member having a configuration similar to the configuration of the bottom plate 43 including a projection 54 which in the assembled unit lies in superposed relation with projecting lug 47 on the bottom plate 43. A rectangular cutout section in top member 55 extends coextensively with the recess 48 in bottom plate 43. Apertures 56 in the four corners of the top plate 46 are located in aligned relation with rivet holes 51 to permit extension of tubular rivets therethrough to secure the members 43–47 in an integral assembly.

Cable 38 is a shielded microphone cable, one end of which is separated and extended through the passageway 49 on opposite sides of the T separator 50. One of the conductors thus provided is soldered to a thin metal contact which fits on shelf 52 and contacts the crystal element 44 and the other is extended through passageway 44c of member 44a and soldered to one end of contact member 44d. The other end of cable 38 is terminated by a conventional phono plug (FIGURES 1 and 3) having a housing of sufficient size to permit the connection of a .5 mfd. capacitor 58 across the ends of the cable 38 which are received thereby.

An assembled gum rubber portion 45 defines a sensing surface on the transducer 37, and with the application thereof to the surface of an object, the contact plate 44a is depressed and pusher 44e thereon deflects the crystal element 44 downwardly relative to its supporting ends to initiate the generation of electrical signals related to the nature of the phenomena detected by the sensing surface.

The equivalent electrical circuit provided by the pulse transducer 37 and capacitor 58 in such connection is set forth in the illustration of FIGURE 3. In accordance with an important feature of the invention the value of the capacitor 58 has been selected to provide a frequency response which is flat to 200 cycles per second whereby the signals provided by the transducer are filtered to eliminate the interfering noises which are normally encountered in the field, and which are normally of a value to prevent observation of the detected signals which relate to patient pulse.

The novel assembled transducer has a sensitivity of .17 volt/Newton, a high impedance, a time constant in open circuit of three minutes, no distortion to the breaking point at .5 kilogram, a pulse strength of approximately 5 mv. with a 100K input shunt, and as noted above, a frequency response which is flat from 5 to 200 c.p.s.

The transistorized amplifier circuit contained in housing 35' of the pulse detection set 12 which includes transducer 37 (FIGURE 1) is similar to the amplifier shown in FIGURE 4, and is described in more detail hereinafter. In one commercial embodiment, the amplifier circuit had a gain in the order of two, a time constant of approximately one second, stability variations of less than 5%, and a frequency response which is flat to 200 c.p.s. A six volt battery located within the housing 35' provides a source of power for the transistorized amplifier.

As shown hereinafter, the novel pulse transducer 37 and associated amplifier unit 35 are used in a number of novel monitoring methods including blood pressure measurements, pulse measurements, circulatory measurements, respiratory measurements, fetal detection, and other similar applications. In each of the applications, moreover, the provision of a transistorized preamplifier for the pulse transducer 37 results in an arrangement in which the detected signals may be amplified adjacent the area of signal detection to thereby provide a more reliable, interference-free type display.

The transistor amplifier circuit which is of like construction for each of the units 16, 25, 35 (but different component values) is schematically shown in FIGURE 4. For purposes of explanation the amplifier circuit is shown in its embodiment for inclusion in amplifier unit 35, the circuit structure for the other amplifier units 16, 25 being apparent therefrom. With reference to FIGURE 4, the amplifier circuit 80 includes an input jack 36 connected over a voltage divider network 81, 82 center-tapped to ground, to transistors 83, 86 each of which is commercially available as a GTC–2035, made by the Semi-Conductor Division of General Instruments Corporation of Newark, New Jersey, connected in an emitter-follower configuration. Transistors 83, 86 include emitter elements 83e, 86e, base elements 83b, 86b and collector elements 83c, 86c. Collector elements 83c, 86c are connected to the negative terminal of the potential source 79 (which as noted above comprises a six volt battery), the base elements 83b, 86b are connected over resistances 81, 82 respectively to ground, and to the terminals of the input jack 36, and the emitter elements 83e, 86e, are connected over resistances 84, 85 respectively to the positive terminal of the potential source 79, and also to the control path for transistors 91, 93 which are connected in a push-pull amplifier configuration.

Transistors 91 and 93 comprise transistors commercially available as a GTC-2035, made by the Semi-Conductor Division of General Instruments Corporation of Newark, New Jersey, and include collector elements 91c, 93c, base elements 91b, 93b, and emitter elements 91e, 93e. Emitter elements 91e, 93e, are connected over a voltage divider network including resistances 87, 88, 89, 90 to the positive terminal of the battery source 79, resistor 87 being connected over a wiper arm 87' which is adjustable along the length of resistor 88 to provide a balanced signal output. Resistor 88 is in turn connected in series with resistors 89, 90 between the emitters 91e, 93e. The base elements 91b, 93b are connected to the output circuits of the emitter-follower transistors 83, 86, and the collector elements 91c, 93c are connected over resistors 92, 94 to the negative terminal of source 79 and also over isolating capacitor 95, 96 and 97 to output conductors 98, 99 in the cable 41 which are connected to the output jack 40' (FIGURE 1).

In one specific embodiment of the amplifier unit utilized for amplification of the pulses obtained from the pulse transducer 37, the components are of the following specific values—

Pulse amplifier 35:
| | |
|---|---|
| R81, 82 | 100K |
| R84, 85 | 24K |
| R87 | 20K |
| R88 ohms | 200 |
| R89, 90 do | 390 |
| R92, 94 | 10K |
| C95, 96 mfd | 47 |
| C97 mfd | .47 |

Potential source 6.5 volts.

The EKG amplifier 16 is of identical construction. The EEG amplifier 25 is of like construction and further includes an additional impedance matching stage and a stage of amplification connected in advance of the illustrated circuit 80.

(c) *Signal selection.*—A selector box 13 permits selective monitoring and recording of the different output signals which are provided by the signal detection sets 10, 11, 12, or other accessories, such as temperature, etc. As shown in FIGURE 1, selector box 13 comprises a housing 60 for a four-position selector switch (not shown) including input jacks 61–64 located on one of the side walls of the housing 60. An output jack 65 and a second set of jacks 61A–64A similar to and parallelly connected with jacks 61–64, are located on a second side wall of housing 60, whereby the signals detected by the different sets 10, 11, 12, may be extended into a parallel selector box, if desired.

As shown in FIGURE 1, the signal output of EKG detector set 10 is connected to jack 61, the signal output of EEG signal detector set 11 is connected to jack 62, the signal output of pulse detector set 12 is connected to jack 63, and jack 64 provides connection means for optional accessories. A selector knob 6 located on the cover of housing 660 controls operation of the selector switch to four different positions, the switch in each different position effecting connection of a different one of the input jacks 61–64 to the output jack 65.

The provision of a selector box, such as 13, permits expeditious and instant selection of the different signal detecting sets to the monitor 15, whereby any of a number of different phenomena of the patient may be selectively and expeditiously monitored by the attendant.

(d) *Monitoring of signals.*—Monitor or display device 15 provides a visual display of the signals provided by the signal detecting sets 10–12, and in the present arrangement comprises a metal cabinet or housing 68 which houses a commercial chassis for a conventioanl oscilloscope-type display device, and which has a front control panel which supports an on-off switch 73, a power indicator lamp 74, a sweep doubler knob 76, a sensitivity knob 75, and an input jack 69. The display area of the cathode ray tube 70 is located flush with the front panel and a camera bezel 71 is mounted on the front panel for use therewith. A millimeter scale 71' is provided across the face of the cathode ray tube 70.

A cable 14 including plugs 67, 67' at its remote ends extends the signal output from jack 65 on selector box 13 to the input jack 69 for the chassis in the display device 15 to conduct the signal set selected by the box 13 to the chassis for the display device. A line conductor 72 extends rearwardly from the chassis in the housing 68 through the rear panel of of the housing 68 for the purpose of connecting the unit to a 110 volt A.C. power source. Toggle switch 73 controls connection of the power source over such conductor to the chassis, and indicator lamp 74 is illuminated whenever the switch 73 is operated to connect the power to the chassis.

As noted above, the chassis located within the housing 68 is of known design and basically includes a horizontal sweep amplifier and a vertical sweep amplifier (and a conventioanl power supply) for controlling the electron gun of a cathode ray tube 70 in the display of signal sets received over jack 69. Such manner of operation is described, for example, in the above identified Dornette et al. reference—pages 48–50.

The horizontal sweep amplifier located within the chassis is operative, as energized, to control the beam of the cathode ray tube 70 in the provision of a horizontal trace on the display target at a sweep rate which is variable between a one second and a ten second rate. Sweep doubler control knob 76 located on the front panel of housing 68 permits doubling of the fixed base sweep rate as moved to its most clockwise position, and provides the fixed sweep rate as moved to its most counterclockwise position.

The signals received on the chassis over the input jack 69 are coupled to the vertical sweep amplifier which is operative to control vertical deflection of the beam during its horizontal trace to thereby provide a visual indication of the information represented by the input signals on the display area of the cathode ray tube. Sensitivity adjustment knob 75 permits adjustment of the vertical deflection provided on the display area to different heights.

The simplified nature of the controls (a single control comprising a doubler knob 76 and sensitivity control knob 75) insures the provision of a system which is extremely easy to use while yet providing the necessary information in an interference-free presentation.

In one preferred embodiment, the chassis circuitry has a capacity-coupled input circuit having 100,000 ohm impedance, a time constant of one second, a sensitivity of 5 cm. per .01 volt input, a frequency response which is flat to 200 cycles per second, and a stability variation of 5%. The cathode ray tube comprised a 5 inch persistence type cathode ray tube.

As a further aid to the provision of reliable monitoring, a plug-in jack is connected to an output stage of the vertical amplifier and located on the rear panel of the housing 68 for use with a cable 16 in transmitting the input signals received over input jack 69 (and amplified by the vertical amplifier) to channel PF of a multichannel light ray recorder 17, which may be of the type commercially available from Minneapolis-Honeywell, Heiland Division, model 1603. Recorder 17 operates in accordance with known principles of photographic recorders to provide a graph record 77 of the signals which are coupled to the display device 15 for visual observation on the cathode ray tube 70. A typical pulse record which might be provided by recorder 17 is set forth in the middle section of the graph of FIGURE 5, and is described in more detail hereinafter.

Certain of the apparatus used in the indirect blood pressure determinations including the pump or bulb P, the manometer M, and the standard cuff C are well known in the art. The air pressure to current transducer T connected between such apparatus and the recorder 17 may be of the type commercially available from Minneapolis-Honeywell, Fall River, Massachusetts, as model No. Y1DB 21–300.

*Operation of system*

The novel monitoring system including the several distinct signal detector sets 10, 11 and 12 has numerous applications, and in each use of such system an improved form of monitoring of dynamic phenomena including pulse, pressure, respiration and others has resulted. In each arrangement, the sensing devices and associated circuitry have excellent sensitivity with low noise level, and it is possible to obtain indications with consistently more reliable results than have been obtainable with most equipment known heretofore.

(a) *EEG and EKG determination.*—Assuming that the attendant desires to monitor the EKG phenomea of the patient, the electrodes 21' in the EKG signal detector set 10 are applied to the body of the patient in accordance with known practice (see for example page 66 of the above identified Dornette & Brechner reference), control knob 19 is moved to one of the three electrode selecting positions to select the signals provided by the corresponding one of the electrodes 21', and selector knob 66 on selector box 13 is adjusted to the EKG position. Switch 73 on the display device 15 is operated to the "on" position, the sweep doubler knob 75 is adjusted to provide the desired sweep rate, and knob 76 is adjusted to provide the desired sensitivity on the display. If a printed record of the detected signal information is desired, the recorder 17 is also energized by operation of the on-off switch 17a.

The attendant examines the display device and chart 77 provided by the recorder 17 to ascertain that the detected signals are being displayed thereby. Typical patterns which will now be provided are shown, for example, on pages 72–79 of the above-identified reference.

Normally, the information provided over one lead is sufficient for monitoring purposes. However, if records of the signals on each of the leads is desired, the knob 19 is systematically adjusted to each of its different positions and (assuming the electrodes are attached to the patient) corresponding displays of the information obtained will be provided on the display devices 15 and 17.

Monitoring of the EEG phenomena of a patient is accomplished in a similar manner. In such arrangement the needle electrodes 31 of signal detector set 11 are applied to the patient in accordance with well known practices, as described, for example, on pages 99–101 of the above-identified reference, switch 27 on the amplifier unit 25 is moved to the "on" position, and the selector knob 66 of selector box 13 is moved to the EEG position. The display devices 15 and 17 are then observed by the attendant and adjusted for operation as described above in the matter of the monitoring of EKG phenomena. Typical patterns which may be provided on the display devices 15 and 17 are shown on pages 103–109 of the above-identified reference.

(b) *Pulse determinations.*—In the basic use of the monitor to provide pulse indications, the pulse transducer 37 is held (or attached by suitable means, such as tape) to the body of the patient, such as a finger or on an artery desired to palpate. The knob 42 on amplifier 35 is adjusted to the palpation position, and selector knob 66 on selector box 13 is adjusted to the pulse position. The display device 15 is energized by operating switch 73 to the "on" position. Knob 75 is adjusted to provide the desired sweep rate, and sensitivity of the display is adjusted by knob 76. If a record of the detected pulse is desired, the start switch on the recorder is operated.

With application of the sensing surface of transducer 37 to the surface of the animate object desired to palpate, the depression of the contact member 44a and the consequent deflection of the crystal element 44 (in accordance with known piezo-electric phenomena) in transducer 37 (FIGURE 1) enabled the crystal which thereupon generates signal pulses which are related to the pulse of the patient including the rate and relative strength of the pulse, and such signals are coupled over cable 38 and over the filter including capacitor 58 and plug 39 (FIGURE 3) to input jack 36 and the input circuit for amplifier circuit 80 (FIGURE 4). The signals as coupled to the base elements 83b, 86b of emitter-follower transistors 83, 86 are amplified and coupled to the base 91b, 93b of the transistors 91, 93 for further amplification and coupling over conductors 98, 99, output jack 40', plug 41b (FIGURE 1), cable 41, plug 41a, jack 63, and the selected contacts of the selector switch in selector box 13, output jack 65, plug 67, cable 14, plug 67' and input jack 69 to the vertical amplifier for further amplification and coupling to the electron gun of the cathode ray tube 70.

Figure 5:
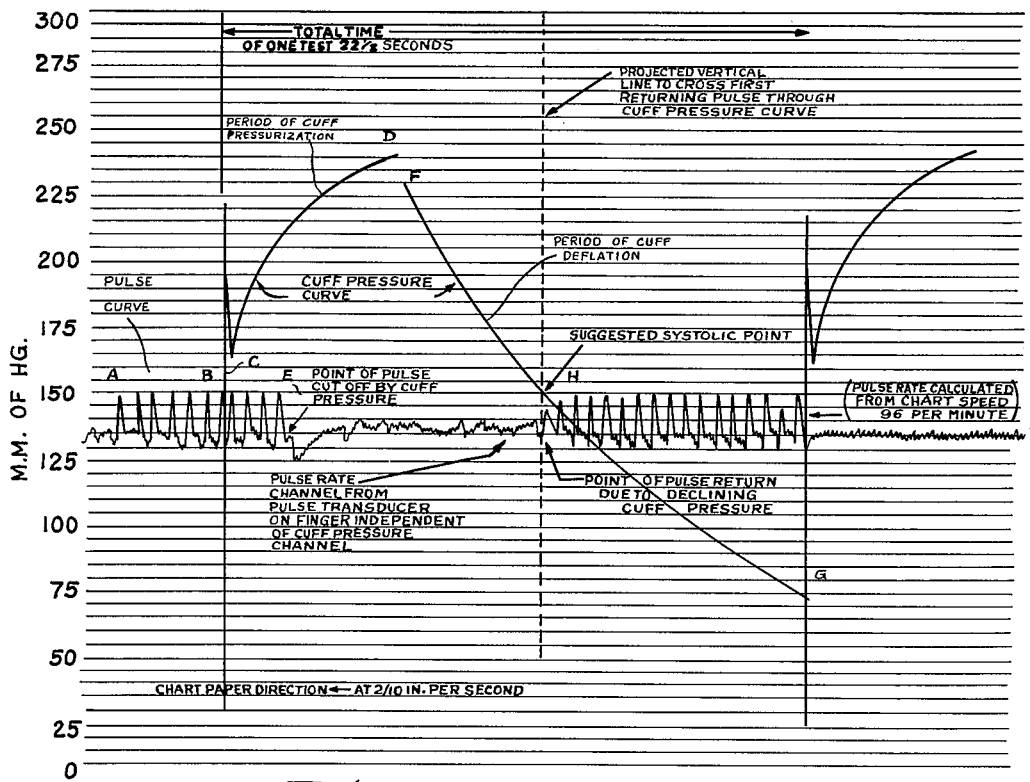
FIGURE 5 is a representative record of information which might be provided by the system as used according to one method of the invention.

The amplified signals generated by the pulse transducer will appear as a pulse trace on the face of the cathode ray tube, a picture of the appearance of a typical set of pulses being shown in the chart of FIGURE 5 (points A–B). Sensitivity knob 76 may be adjusted to increase or decrease the height of the pulses, and sweep doubler knob 75 may be adjusted to vary the sweep rate. The pulse rate may be determined by noting the number of pulses which occur in the time period of a sweep rate (which is known) and mentally calculating the number of pulses which occur is a minute. If a record of the signals is desired, the recorder 17 is coupled to the monitor by means of cable 16 optionally or simultaneously drive one channel of the light ray galvanometer type direct recorder 17 in the provision of a graph of the signals. The pulse signal detector set 12 may also be used to provide a visual indication and record of patient respiration, fatal heart beats, and the like.

(c) *Blood pressure determination.*—According to a further feature of the invention the novel pulse transducer 37 may be used in a novel method to determine the patient blood pressure, and to provide both a visual display and a record thereof. In the practice of such method, a conventional patient cuff C is wrapped about the arm of the patient, and pulse transducer 37 is attached to the patient's artery distal to the cuff desired to palpate. The transducer 37, selector box 13, and display device 15, are connected as described above, and as shown in FIGURE 1.

The attendant thereupon observes the occurrence of the pulse train on the monitor device 15. A standard manometer M connected to the cuff C provides an indication of the pressure in the cuff C, and conventional means, such as a bulb or pump P, is used to pressurize the cuff C, in accordance with known pressure determining techniques. The point at which the pulse disappears on the display device 15 is noted, and shortly thereafter the system is vented by means of vent V, the point at which the pulse returns on the display device 15 is observed, and the pressure is read on the associated manometer M. The reading on the manometer M at such point provides an indication of the systolic blood pressure of the patient.

The same method may be used in the provision of a printed record of the pulse and pressure, and the systolic pressure may be visually observed at the same time. In such arrangement the transducer T and recorder 17 are connected in the system as shown in FIGURE 1, transducer T being connected between the pressure system for cuff C and channel CF on recorder 17, and cable 16 being connected between the vertical amplifier in the chassis for cathode ray tube 70 and the channel PF on the recorder 17 to extend the pulse representative signal thereto.

In use, the pulse transducer 37 is coupled to the artery desired to palpate distal to the cuff, the pulse is then noted to chart on the monitor 15 and recorder 17, and the chart paper drive is actuated at the rate of 2/10 inch per second. The standard technique consisting of pressurizing and venting the cuff is then followed, and as a result of such connections, the signal output of the transducer T which is extended over conductor C1 to the channel CF on recorder 17 results in the tracing of a calibrated cuff pressure curve CD–FG on the chart which corresponds to the pressure in mm. of Hg cycle in the cuff. Simultaneously the signal output of the signal detector 37 which is coupled over amplifier 35 and selector box 13 to the display device 15 and further over cable 16 to the second channel PF of the recorder 17 results in the trace of a record of the patient pulse on the recorder chart (identified in the drawing as "cuff pressure curve" and "pulse curve," respectively).

With reference to FIGURE 5, the portion of the pulse curve A–B indicates a typical signal output which will appear on the screen of the cathode ray tube 70 during the period prior to pressurization of the cuff C. The portion of the cuff pressure curve which appears between points C and D on the exemplary chart indicates the period of pressurization of the cuff C. It will be apparent that the simultaneous coupling to the recorder device 17 of the output signals of one set of signals which are related to the pulse of the object, and another set of signals which are related to the cuff pressure applied to the object, will result in the trace of a pair of curves on a common time base on the moving chart. The provision of the two curves on a common time base in this manner is, of course, essential if an accurate systolic point is to be obtained after the actual test by comparison of the pressure and pulse information. More specifically, referencing of the cuff pressure curve between points C and D to the horizontal axis (time) indicates the period of pressurization, and referencing of the points C and D to the vertical axis on the left hand side of the chart indicates the pressure readings at the start and termination of cuff pressurization (0 mm.–240 mm. in the present example). Point E on the pulse curve indicates the point of pulse cut-off, and points F and G on the cuff pressure curve indicate the period of cuff deflation. The pulse is shown to have returned at point H on the pulse curve. If the attendant reads the manometer (or the meter 1M on the transducer) at the time that the pulse is detected on the display device 15, such reading will provide an indication of the systolic blood pressure of the patient. Additionally, such information can be obtained at a later time by drawing a vertical line through point H (point of pulse return) to intersect the cuff pressure curve F, G. Such point of intersection is then referred to the vertical axis to obtain an indication of the patient's systolic pressure. In the example of FIGURE 5 the systolic pressure is in the order of 150 mm., Hg.

According to another novel method which is referred to hereinafter as the oscillometry method of determining blood pressure, the pulse transducer 37 is placed within the cuff envelope as wrapped about the arm of the patient with the sensitive side of the pulse transducer (the gum rubber surface 45) located in contact with the balloon or bladder of the cuff. The cuff C is then pressurized and the value of pressure at the time of maximum pulse is detected. Such value will be near the mean arterial pressure, since beyond this point the artery is occluded more and more completely. In most instances such indication is sufficient for the physician to use as the value of the mean blood pressure. Use of the transducer to provide a signal set to channel CF of the recorder 17 and use of cable 16 to couple the signals detected by the pulse transducer 37 to the channel PF of recorder 17 will provide a printed record of the results in the manner described above.

Such method of determining mean pressure is normally used whenever the condition of the patient is such that it is difficult to obtain signals in the use of the palpation method.

In each of the foregoing methods, the provision of a chart record by use of a recorder 17 eliminates the time which would be wasted in searching for the pulse or studying the pressure level during the blood pressure determining techniques normally employed. Additionally, the entire cycle can be performed in twenty seconds, and the actual patient blood pressure may be accurately determined at a later period. Such advantages further permit the provision of a central monitoring system in which an entire ward of patients may be maintained in a relatively brief period of time.

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. In a system for providing a display of information relating to the phenomena of an animate object, signal detector means including means operative to generate a first set of signals related to the pulse of said object, pressure measuring means including a cuff for said object, and means operative to provide a second set of electrical signals related to the cuff pressure applied to the object, a displayed unit including recorder means for providing a separate trace on a common time base for each different set of electrical signals which are simultaneously coupled thereto, and means for simultaneously coupling said first and said second set of electrical signals to said recorder means to provide a separate trace of pulse and pressure information on a common time base.

2. In a monitoring system for providing a display of information relating to the condition of at least one patient including at least a signal detector means operative to generate potentials representative of the occurrence of pulses in the body, a display device including recorder means having at least a first and a second input circuit for simultaneously controlling the tracing of two separate curves, means operable to couple the pulse representative signals provided by said signal detector means to said first input circuit for the recorder means in said display unit, and pressure determining means including a pressure cuff for the patient, cuff control means including means for controlling inflation of the cuff, and means for controlling venting of the cuff, and transducer means for coupling electrical signals representative of the pressure in the cuff to said second input circuit for the recorder means in said display unit simultaneously with said pulse signals to thereby provide a record of the pressure and pulse information as two separate curves on a common time base.

3. In a monitoring system for providing a display of information relating to the condition of an animate body including at least a signal detector means having an electrical transducer including a piezo-electric crystal, and support means for supporting said crystal for yielding deflection and the generation of potentials related to body pulses with application of the transducer to the body, a display device including recorder means for providing separate curve traces on a common time base for different sets of signals, connector means operable to couple the signals provided by said signal detector means to said recorder means in said display unit, pressure determining means including a pressure cuff for the patient, cuff control means including means for controlling inflation of the cuff, and means for controlling venting of the cuff; and transducer means for coupling signals representative of the pressure in the cuff to said recorder means in said display unit simultaneously with said pulse information for recording as two separate information curves on a common time base.

4. A system as set forth in claim 1 in which said signal detector means includes a compact housing adapted to be located immediately adjacent the user, a transistor amplifier in said housing, and means for coupling said amplifier to a source contained within said housing.

5. A system as set forth in claim 1 which includes EKG means for providing a set of electrical signals relative to cardiac activity, EEG means for providing a set of electrical signals related to cortical activity, and in which said first means includes a further display unit and selector means for selectively coupling the pulse, EKG and EEG electrical signals to at least one of said display units.

6. In a system for providing a display of information relating to the blood pressure phenomena of a body, signal detector means including an electrical transducer having a piezo-electric crystal operative to generate potentials to indicate the occurrence and occlusion of the pulse, including the rate and relative amplitude of the pulse with application of the transducer to a body, pressure measuring means including means operative to provide electrical signals related to the blood pressure of the body comprising a pressure cuff control means for controlling inflation and venting of said cuff, and transducer means for providing electrical signals representative of the pressure in the cuff; a display unit for providing a display of patterns of electrical signals as coupled thereto, and connector means for coupling the electrical signals representative of said pulse and pressure information provided by said signal detector and pressure measuring means to said display unit.

7. A system as set forth in claim 6 in which said display unit comprises a recorder device having a first recording channel for making a graph on a record member of the pressure signal patterns, and a second channel for providing a graph of pulse signals on the same record member for comparison therewith.

8. A system as set forth in claim 6 which includes a cathode ray tube display unit, and in which said signal detector means also includes means for simultaneously coupling said pulse representative signals to said cathode ray tube display device.

9. In a system for providing a display of information relating to the phenomena of a body, at least one signal detector means including signal generator means operative to generate signals related to the pulse of the body with application of the signal detector means to a body, filter means for filtering the generated signals to provide a flat response over a predetermined range of pressures to be represented with a sharp cutoff thereafter, a display unit for providing a visual display of the patterns of electrical signals as coupled thereto, and means operable to selectively couple the filtered signals to said display unit for display purposes.

10. In a system for providing a display of information relating to the pulse phenomena of an animate body, signal detector means including an electrical transducer having a piezo-electric crystal, means for controlling enabling of said crystal with application of the transducer to a surface on an animate body, filter means connected to filter the signal output of said crystal in the provision of a flat response between 5 to 200 cycles per second, and means for coupling the filtered signals to an associated display device for display thereon.

11. In a system for providing a display of information relating to the phenomena of a body, signal detector means including an electrical transducer operative to generate potentials related to body pulsations, said electrical transducer having a flat piezo-electric crystal, housing means having a recess, ledge means located at each end of said recess to support the ends of said crystal to permit depression of the central portion thereof into said recess, contact means supported above said crystal for sensing contact with a body including a pusher element disposed to depress the central portion of said crystal with application of the transducer to a body, and conductor means for coupling the signals generated by said crystal with movement thereof by said pusher element to an associated display device for display thereon.

12. In a system as set forth in claim 11 in which said housing includes a projection located at one end thereof including a passageway for introducing said conductor means into said housing, and a strain relief member for said conductor means integral with said housing located at the inner end of said passageway.

13. In a system for providing a display of information relating to the phenomena of a body, signal detector means including an electrical transducer having a piezo-electric crystal, means for enabling said crystal to provide signals related to the phenomena detected responsive to application of said transducer to a surface of a body, conductor means for coupling said signals to associated means including plug means at one end of said conductor means for mating with a jack on said associated means, and filter means housed within said plug operative to filter the signal output of said crystal to provide a flat frequency response over a predetermined range.

14. A method for determining the systolic blood pressure of the body comprising the steps of attaching a cuff to the limb of a patient, placing an electrical transducer distal to the cuff to generate an electrical signal related to the pulse at such point, occluding blood flow in the limb by the controlled application of pressure to the cuff to terminate the pulse generation, reducing the pressure applied to the cuff to remove the occlusion, and providing a record of the instant of generation of further electrical signals which signify pulse occurrence, and providing a record of the pressure in the cuff at said instant.

15. A method of determining the mean blood pressure of the body which comprises occluding blood in an artery by the controlled application of pressure to a cuff in a limb of the patient, inserting a signal generating device in the cuff above the point of occlusion to generate signals related to the value of the blood pulse, coupling a controlled pressure to the cuff, coupling the generated signals to a display device for the purpose of observing maximum pulse, and determining the cuff pressure at the time of occurrence of maximum pulse.

References Cited by the Examiner
UNITED STATES PATENTS

| | | | |
|---|---|---|---|
| 2,400,583 | 5/1946 | White | 128—2.06 |
| 2,702,354 | 2/1955 | Chorpening | 128—2.05 X |
| 2,875,750 | 3/1959 | Boucke | 128—2.05 |
| 2,944,542 | 7/1960 | Barnett | 128—2.05 |
| 3,020,119 | 2/1962 | Marchal | 128—2.05 X |
| 3,095,872 | 7/1963 | Tolles | 128—2.05 |
| 3,132,643 | 5/1964 | Baum | 128—2.05 |

OTHER REFERENCES

Peterson, "A Method for Recording . . ." pp. 771–782 of American Heart Journal, vol. 37, 1949.

Glasser, Medical Physics, vol. 3, pp. 391–396 GH505, G55 Year Book Publishers, 1960.

RICHARD A. GAUDET, *Primary Examiner.*

RICHARD J. HOFFMAN, LOUIS R. PRINCE,
*Examiners.*